(12) United States Patent
Nelson et al.

(10) Patent No.: US 9,045,379 B2
(45) Date of Patent: Jun. 2, 2015

(54) PLANT GROWTH SUBSTRATE MEDIUM

(71) Applicant: PLANT SCIENCES, INC., Watsonville, CA (US)

(72) Inventors: Steven Douglas Nelson, Watsonville, CA (US); Michael Dean Nelson, Watsonville, CA (US); Daniel Steven Nelson, Watsonville, CA (US); David Johnston, Bridgwater (GB)

(73) Assignee: PLANT SCIENCES, INC., Watsonville, CA (US)

( * ) Notice: Subject to any disclaimer, the term of this patent is extended or adjusted under 35 U.S.C. 154(b) by 0 days.

(21) Appl. No.: 14/064,662

(22) Filed: Oct. 28, 2013

(65) Prior Publication Data

US 2015/0113871 A1    Apr. 30, 2015

(51) Int. Cl.
   *A01G 17/00*       (2006.01)
   *C05F 11/00*       (2006.01)
   *A01G 1/00*        (2006.01)

(52) U.S. Cl.
   CPC ............... *C05F 11/00* (2013.01); *A01G 1/001* (2013.01)

(58) Field of Classification Search
   CPC ............................. A01G 17/005; A01G 17/00
   USPC ......... 47/58.1 FV, 58.1 SC, 58.1 R, 1.01 R, 9
   See application file for complete search history.

(56) References Cited

U.S. PATENT DOCUMENTS 5,802,763 A * 9/1998 Milstein ............................ 47/56

\* cited by examiner

*Primary Examiner* — Peter M Poon
*Assistant Examiner* — Thien Thanh Pham
(74) *Attorney, Agent, or Firm* — Lowe Hauptman & Ham, LLP

(57) ABSTRACT

The present disclosure provides materials and methodology for growing plants, such as small fruit plants. For example, and in one embodiment, agricultural by-products, such as nut shells, could be used as or in a plant growth medium for growing a strawberry, raspberry, blackberry, blueberry, and/or black-raspberry.

2 Claims, No Drawings

PLANT GROWTH SUBSTRATE MEDIUM

FIELD

The present disclosure relates to the field of horticulture. More specifically, the present disclosure provides material and methodology for plant growth, such as small fruit production.

INTRODUCTION

Soil provides support, nourishment, and aeration to the host plant, which facilitates plant growth and development. For example, a soil should support a growing plant by holding roots stationary, retain moisture and nutritional elements in a form easily absorbed by the plant, and permit oxygen exchange in the root zone. Additionally, a soil should provide adequate drainage so as to prevent water logging, as well as a medium free of pathogens that could prove detrimental to the plant.

Most naturally occurring soils, however, do not have all of the above-mentioned characteristics. Synthetic soils, commonly referred to as potting soils, have been used extensively in the horticultural industry and, when properly designed, can be superior to naturally occurring soils as a growing medium. Most synthetic soils contain nitrogen, phosphorous, and potassium, in addition to other minerals and elements that promote plant growth.

SUMMARY

In one aspect, provided herein is methodology for producing a small fruit, comprising growing a small fruit plant or part thereof in a composition comprising almond hulls and/or husks, or a substrate derived directly from almond hulls and/or husks. In one embodiment, a small fruit plant is a strawberry, raspberry (any color), blackberry, blueberry and/or black-raspberry plant. In another embodiment, a plant part thereof is a seedling, stolon, runner, seed, leaf, cane, or root cutting.

In another aspect, the disclosure provides a composition for producing a small fruit, wherein said composition comprises almond hulls or husks. In one embodiment, a small fruit is a strawberry, raspberry (any color), blackberry, blueberry and/or black-raspberry. In one embodiment, the composition is soilless. In another embodiment, said soilless composition is made by: (a) grinding almond husks and hulls to produce a range of size particles that are reconstituted to form crop specific substrates; (b) washing the substrates to remove unwanted particles and chemicals; (c) buffering to provide a safe growing medium; and (d) preparing media as bulk or grower packs.

In another aspect, Applicants provide a method for producing a strawberry, comprising growing a strawberry plant or part thereof in a medium comprising almond hulls or husks.

In another aspect, there is a method for producing a raspberry (any color), comprising growing a raspberry plant or part thereof in a medium comprising almond hulls or husks.

In another aspect, there is a method for producing a blackberry, comprising growing a blackberry plant or part thereof in a medium comprising almond hulls or husks.

In another aspect, there is a method for producing a blueberry, comprising growing a blueberry plant or part thereof in a medium comprising almond hulls or husks.

In another aspect, there is a method for producing a black-raspberry, comprising growing a black-raspberry plant or part thereof in a medium comprising almond hulls or husks.

In another aspect, provided herein is a method for producing a strawberry, raspberry, blackberry, blueberry and/or black-raspberry, comprising a) obtaining a substrate medium comprising crushed almond hulls or husks; b) planting a strawberry, raspberry, blackberry, blueberry, and/or black-raspberry plant or part thereof in said medium; and c) growing said plant or part thereof to maturity, wherein said plant produces a strawberry, raspberry, blackberry, blueberry, and/or black-raspberry. In one embodiment, said composition is a soilless growth media. In another embodiment, said soilless growth media is made by: (a) grinding almond husks and hulls to produce a range of size particles that are reconstituted to form crop specific substrates; (b) washing the substrates to remove unwanted particles and chemicals; (c) buffering to provide a safe growing medium; and (d) preparing media as bulk or grower packs.

In another aspect, there is a method for growing a small fruit plant, comprising: a) crushing almond hulls or husks to produce a substrate growth medium; b) planting a small fruit plant or part thereof in said medium; and c) growing said plant or part thereof to maturity, wherein said plant produces a small fruit. In one embodiment, the small fruit is a strawberry, raspberry, blackberry, blueberry and/or black-raspberry.

In another aspect, provided is a substrate medium for growing a small fruit plant, wherein said medium comprises crushed or shredded or ground almond hulls or husks. In one embodiment, the medium is soilless. In one embodiment, a small fruit is a strawberry, raspberry (any color), blackberry, blueberry and/or black-raspberry.

DETAILED DESCRIPTION

The present inventors discovered materials and methods for growing plants, such as small fruit plants. In one aspect, the inventors discovered that agricultural by-products, such as nutshells, could be used as or in a plant growth medium. For example, and in no way limiting, the present inventors contemplate using almond hulls or husks for use in a plant growth medium for growing small fruit plants, such as strawberry, raspberry, blackberry, blueberry, or black-raspberry.

Thus, the present inventors provide a new use for agricultural waste products, such as almond hulls or husks. In this regard, the present disclosure provides materials and methodology for converting agricultural by-product into a composition suitable for plant growth and development, while simultaneously reducing the accumulation of a waste product. The instant materials and methodology may provide a plant, such as a small fruit plant, with growth habitat that is equal or superior to commercial potting soils or naturally occurring topsoils.

Technical terminology in this description conforms to common usage in horticulture, biochemistry, agriculture, and the like. This usage and these technical terms are explicated in: *Soils and Other Growth Media* SBN 333125711 The Macmillan Press and Strawberries ISBN 0-85199-339-7 and *Integrated Pest Management For Strawberries* ISBN 978-1-60107-489-8.

As used herein, "husk" or "hull" refers to the outer covering which houses a seed or nut. For instance, for an almond, which is not a true nut, the husk or hull refers to the outer shell and casing housing the almond "nut."

"Substrate medium" refers to a composition suitable for growing a plant that does not contain natural earth soil, in whole or primarily. For example, and in no way limiting, a substrate medium may be comprised of husks or hulls, such as almond husks or hulls.

"Plant growth medium" encompasses any medium suitable for growing a plant. In a non-limiting example, a plant growth medium may comprise almond husks or hulls.

"Small fruit" includes any of strawberry, raspberry (any color), blackberry, blueberry and/or black-raspberry. A small fruit refers to the plant itself as a whole, as well as any part thereof, such as a berry, seedling, stolon, runner, seed, leaf, cane, or root cutting.

A. Plant Growth Medium

Applicants contemplate a plant growth medium comprising the hulls or husks from nuts or seeds, such as almond hulls or husks. The instant growth medium may be used for growing small fruit plants, such as strawberry, raspberry (any color), blackberry, blueberry and/or black-raspberry.

The growing medium is distinct from using almond material as a soil ameliorant (mulch and or surface applied). That is, the instant growth medium is a treated and manufactured almond product, whereas a soil ameliorant is an additive to a soil. In an embodiment, the plant growth medium may be soilless.

Illustrative Almond Shell and Husk Growing Substrate Medium

As explained above, Applicants provide methodology for creating and formulating a plant growing medium for use in small fruit (strawberry, raspberry (any color), blackberry, blueberry and black-raspberry). Accordingly, a processed and formulated product can be denoted as an "Almond Substrate" also referred to herein as a "Plant Growth Medium."

An Almond Substrate can be variously formulated according to crop requirement and growing situation. In all situations, however, a product is intended for use in containers, including; open top troughs, circular, rectangular and triangular pots and polyethylene (and other plastics) water and growing media retaining products.

Ingredients

Raw, untreated almond shell and almond husk direct from the almond hulling and processing factory or almond grower.

Treatments

Almond shell to be milled (chopped and ground) to provide a mixture of various grades of material. This material is then passed through a sieve process to grade out material into grain sizes from <0.1 mm to 12 mm in size bands of 0.5-12 mm.

Almond husk in a dry state is similarly milled and sieved.

The sized product will be reconstituted to give prescribed water holding capacity (WHC) and Air filled Porosity (AFP) characteristics to suit each crop and growing conditions.

Prior to reconstitution, each product line is assessed for its chemical characteristics, such as the presence or absence of key beneficial or detrimental salts and minerals. In addition the product further processing is to provide a suitable growing medium.

The product will in most situations require.

Washing with clean water to remove excess salts of chloride, sodium and silicates etc. Washing to achieve an electrical conductivity <300 microseimens for salt intolerant crops and <500 microseimens for salt tolerant crops.

Buffering with a solution of calcium nitrate, calcium carbonate or calcium bicarbonate (other calcium products such as calcium sulphate). At times this process will be combined with the washing process. The buffering aids the removal of salts. At the end of buffering the proprietary almond substrate product will contain 10-50 ppm Ca and 5-50 ppm nitrate as a normal range.

pH (acidity and alkalinity) End product requiring a low pH and or bicarbonate (HCO) will be treated with a solution containing either phosphoric acid or ammonium nitrate or a combination of the two or sulphuric acid or proprietary products such as Nfuric acid (sulphuric acid with urea). An end product requiring a high pH (alkaline) will be dressed with either calcium carbonate or calcium sulfate. Or a mixture.

Drying Product will be finished according to end use with a water content of 10-100% of its WHC.

Product Presentation The product will be variously prepared according to end use; bulk, compacted bulk, filled containers, bagged loose fill and bagged compacted.

End User Requirements End uses will variously prescribe the addition of fertiliser and trace elements as dry granular and powder compounds and branded controlled release formulations.

B. Plant Growth

The instant growth medium can be used to support plant growth, such as small fruit plant growth. Such product would be a direct substitute for alternative medium including peat and coco fiber substrates, and crop planting and growing would follow the conventions established in commerce.

Specific Examples are provided below to demonstrate preparation of an illustrative plant growth medium. The Examples are illustrative and non-limiting.

Example 1

Preparation of Plant Growth Substrate Medium

Almond Shell and Husk Growing Substrate

The present disclosure describes the process of creating and formulating a plant growing medium for use in small fruit (strawberry, raspberry (any color), blackberry, blueberry and black-raspberry). The processed and formulated product being the "Almond Substrate," also referred to herein as "Plant Growth Medium."

The Almond Substrate being variously formulated according to crop requirement and growing situation. In all situations the product is intended for use in containers, including; open top troughs, circular, rectangular and triangular pots and polyethylene (and other plastics) water and growing media retaining products.

Ingredients

Raw, untreated almond shell and almond husk direct from the almond hulling and processing factory or almond grower.

Treatments

Almond shell to be milled (chopped and ground) to provide a mixture of various grades of material. This material is then passed through a sieve process to grade out material into grain sizes from <0.1 mm to 12 mm in size bands of 0.5-12 mm.

Almond husk in a dry state is similarly milled and sieved.

The sized product will be reconstituted to give prescribed water holding capacity (WHC) and Air filled Porosity (AFP) characteristics to suit each crop and growing conditions.

Prior to reconstitution each product line is assessed for its chemical characteristics, such as the presence or absence of key beneficial or detrimental salts and minerals. In addition the product further processing is to provide a suitable growing medium.

The product will in most situations employ:

Washing with clean water to remove excess salts of chloride, sodium and silicates etc. Washing to achieve an electrical conductivity <300 microseimens for salt intolerant crops and <500 microseimens for salt tolerant crops.

Buffering with a solution of calcium nitrate, calcium carbonate or calcium bicarbonate (other calcium products such as calcium sulphate). At times this process will be combined with the washing process. The buffering aids the removal of salts. At the end of buffering the proprietary almond substrate product will contain 10-50 ppm Ca and 5-50 ppm nitrate as a normal range.

pH (acidity and alkalinity) End product requiring a low pH and or bicarbonate (HCO) will be treated with a solution containing either phosphoric acid or ammonium nitrate or a combination of the two or sulphuric acid or proprietary products such as Nfuric acid (sulphuric acid with urea). An end product requiring a high pH (alkaline) will be dressed with either calcium carbonate or calcium sulfate. Or a mixture.

Drying Product will be finished according to end use with a water content of 10-100% of its WHC.

Product Presentation The product will be variously prepared according to end use; bulk, compacted bulk, filled containers, bagged loose fill and bagged compacted.

End User Requirements End uses will variously prescribe the addition of fertiliser and trace elements as dry granular and powder compounds and branded controlled release formulations.

Example 2

Small Fruit Production in Plant Growth Medium

A plant growth medium, such as an Almond substrate, is prepared as described according to end user requirements. As illustration of the process of use, which follows conventional growing techniques, the below description contemplates growing a strawberry plant in such substrate.

The substrate is supplied within a plastic sleeve at a consumer prescribed dimension. The substrate is placed onto field ridges, flat ground, or a support system as conventionally used. The product is to be wetted up by irrigation water prior to use, fertilizer products would be used. The product is ready to use when the moisture and fertilizer concentration is stabilized.

As an example, and not limiting in any way, a strawberry plant would be planted either as a "bare-root" or potted plant, as per conventional commercial production. The root is either totally buried within the medium as per all bare root plants or potted plants may be laid on the surface of the medium and covered with an additional layer of almond substrate.

Once planted, the plant would be irrigated (watered) or "fertigated" (water plus fertilizer) according to the specific requirements of the plant, location, and substrate combination, as would be the norm in commercial production.

At the end of the cropping period the substrate is either; taken to waste, applied as a manure to open ground, or fumigated for re-use (re-use may be over a period of several years).

What is claimed is:

1. A method for producing a small fruit selected from the group consisting of strawberry, raspberry, blackberry, blueberry, and black-raspberry, comprising:
   a) obtaining a substrate medium comprising at least one of crushed almond hulls, almond husks, or almond shells, wherein said substrate medium is made by grinding at least one of almond husks, hulls, or shells to produce a range of size particles that are reconstituted to form crop specific substrates;
      (ii) washing the substrates to remove unwanted particles and chemicals;
      (iii) buffering to provide a safe growing medium; and
      (iv) preparing media as bulk or grower packs
   b) planting a strawberry, raspberry, blackberry, blueberry, or black-raspberry plant, or part thereof, in said medium; and
   c) growing said plant or part thereof to maturity, wherein said plant produces a strawberry, raspberry, blackberry, blueberry, or black-raspberry.

2. A method of plant or fruit production, comprising:
   a) obtaining a substrate medium comprising at least one of crushed almond hulls, almond husks, or almond shells, wherein said substrate medium is made by grinding at least one of almond husks and hulls to produce a range of size particles that are reconstituted to form crop specific substrates;
      (ii) washing the substrates to remove unwanted particles and chemicals;
      (iii) buffering to provide a safe growing medium; and
      (iv) preparing media as bulk or grower packs
   b) planting a plant, in said medium; and
   c) growing said plant or part thereof to maturity.

* * * * *